United States Patent [19]
Fujiwara

[11] 3,724,751
[45] Apr. 3, 1973

[54] DISC-TYPE STEAM TRAP

[76] Inventor: Katsuji Fujiwara, No. 191, Nishitani, Hiraoka-cho, Kakogawa, Japan

[22] Filed: Feb. 22, 1971

[21] Appl. No.: 117,416

[52] U.S. Cl. ..................................236/59, 137/183
[51] Int. Cl. ..................................F16t 1/04
[58] Field of Search......236/101, 33, 48, 93, 102, 59; 137/183, 200

[56] References Cited

UNITED STATES PATENTS

| 3,664,363 | 5/1972 | Miyawaki | 137/183 |
| 1,059,558 | 4/1913 | Orr | 236/93 |
| 2,825,507 | 3/1958 | Eskin | 236/48 R |
| 3,104,813 | 9/1963 | Baatrup | 236/102 |

Primary Examiner—William E. Wayner
Attorney—Toren and McGeady

[57] ABSTRACT

A disc type steam trap having a disc valve floatingly arranged within a pressure chamber which is formed by a valve seat and an inner cover, wherein a bimetallic member to be expanded and contracted due to temperature change, an annular member having a conical or inverted conical slanted face on its lower side, an overhanging portion, a valve seat provided with a conical or inverted conical slanted face, a flat annular member, and annular grooves are provided in pertinent combinations to assure high performance of the trap.

8 Claims, 6 Drawing Figures

INVENTOR.
KATSUJI FUJIWARA
BY Toren and McGeady
ATTORNEYS

DISC-TYPE STEAM TRAP

BACKGROUND OF THE INVENTION

When a disc-type steam trap attached to any steam operating machinery receives the inflow of a large quantity of air, there is caused a change of dynamic pressure when the air passes along the lower face of a disc valve located within the trap, which is similar to the case of steam; namely, there is caused a pressure drop due to the increase of air speed passing along the lower face of the disc valve. As a result the disc valve will be attracted in the direction of the valve seat to close the valve port. When the valve port is closed by moisture in the air in the piping, the air will not condense so that even though condensate flows into the trap and causes temperature drop therein, the air confined within the pressure chamber would not cause a pressure drop. Therefore, the disc valve would not open the valve port and the valve will be rendered inoperative. This common phenomenon is known as "air binding" may occur during start up of the machinery, as well as during normal operation thereof due to the accumulation of very small quantities of air contained in the steam. In the disc-type steam trap, this air binding is particularly liable to occur thereby creating a highly deleterious effect upon the operation of the device.

To eliminate such an air binding, prior art disc-type steam traps have been contrived and used with a bimetal ring having an open peripheral portion provided in an annular space formed by a valve seat and an inner cover within a pressure chamber so as to surround said valve seat, with a conical slanted face being provided on said valve seat so that expansion and contraction of said bimetal ring due to temperature change may be utilized and converted into vertical motion of said ring. In such a device, the bimetal ring will move upwardly along the conical slanted face of said valve seat with contraction thereof caused by temperature drop forcibly pushing up the disc valve, opening the valve port, venting the air mixed in the pressure chamber, and thus eliminating the air binding.

However, in such a construction, at the time of starting, while the disc valve is pushed up by the bimetal ring and the condensate is drained, the disc valve and the bimetal ring are vertically vibrated by flow resistance or dynamic pressure change, etc. due to the draining fluid. At the same time, the bimetal ring is heated and expanded and eventually it will be strongly adhered to the inner wall of the cover at a higher position than the valve seat. In such a condition, since there is clearance between the disc valve and the cover, the disc valve will be displaced upon the bimetal ring in an operative position thereby preventing closing of the valve port even though the draining fluid is converted into steam.

Furthermore, in a disc type steam trap having this type of construction, in order for the disc valve to accurately open and close in response to expansion and contraction of the bimetal ring, it is necessary to limit expansion and contraction of said bimetal ring at a predetermined position. During operation of the steam, if dust or the like enters the annular space formed between the valve seat, where the bimetal ring is located, and the inner cover, the bimetal ring will be prevented from expanding and contracting to the extent necessary even though an appropriate temperature had been reached. When the bimetal ring does not sufficiently expand or contract in normal operation to actuate the disc valve, air binding will not be eliminated, and malfunction of the steam trap will result.

SUMMARY OF THE INVENTION

Briefly, the present invention may be described as an improvement in a disc type steam trap comprising, in combination, means defining a valve seat, a disc valve arranged to engage and disengage said valve seat, annularly shaped bimetallic means operable to expand and contract in a diametral direction upon exposure to variations in temperature, means comprising a slanted surface extending obliquely to said diametral direction, said bimetallic means engaging said slanted surface to be moved thereby in a direction perpendicular to said diametral direction upon expansion or contraction of said bimetallic means, and an annular member interposed between said bimetallic means and said disc valve for transmitting said perpindicular motion of said bimetallic means to said disc valve to effect engagement and disengagement of said disc valve with said valve seat.

By a further aspect of the present invention, means are provided for limiting movement of the annular member or of the bimetallic means thereby to prevent excessive motion of the parts which could cause unwanted displacement and malfunction of the disc valve. By another aspect of the invention grooved means are provided in juxtaposition to the bimetallic means to permit displacement into said grooved means of dust or foreign matter which might otherwise impede proper operation of the bimetallic means.

Thus, an object of this invention is to obtain a steam trap and of high performance and trouble-free operation.

Another object of this invention is to provide a disc type steam trap assuring constant smooth operation by elimination of interference with the expansion and contraction of the bimetal ring which would otherwise result when dust or foreign matter enters the space where the bimetal is located.

BRIEF DESCRIPTION OF THE DRAWINGS

The present invention will be better understood by reference to the following detailed description thereof taken in connection with the accompanying drawings wherein.

DESCRIPTION OF THE PREFERRED EMBODIMENTS

Figure 1:
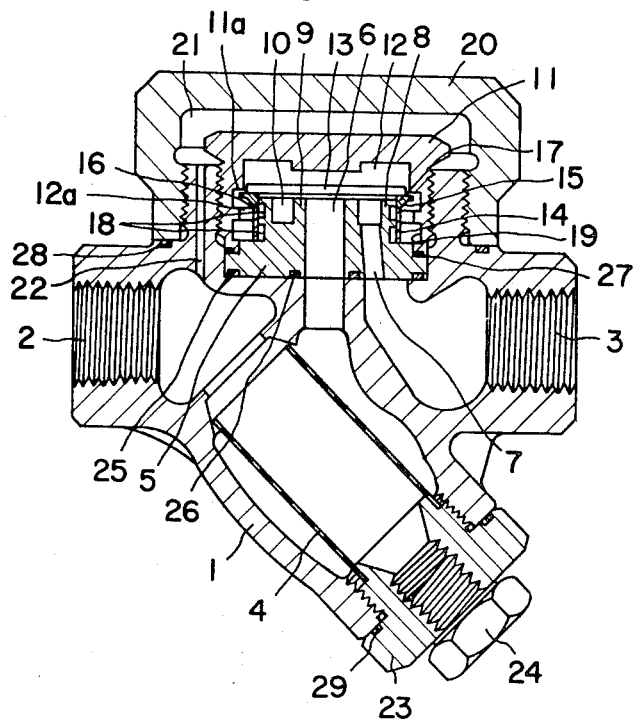
FIG. 1 is a longitudinal section of a disc type steam trap according to this invention, showing a state when the trap is not in operation.
Figure 2:
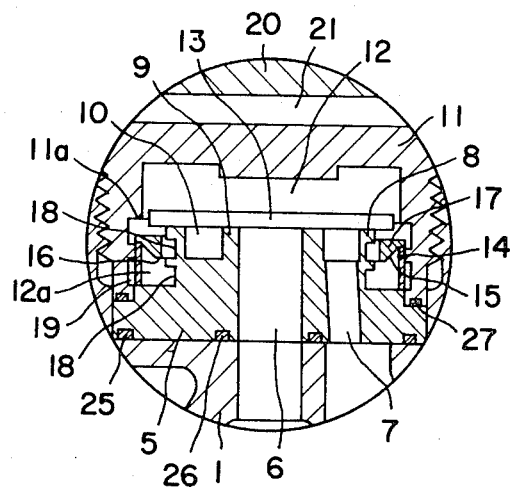
FIG. 2 is an enlarged longitudinal section of main parts of said trap, showing the valve closed when the trap is in operation.

Referring now in more detail to the drawing there is shown in FIGS. 1 and 2, a principal body 1 of a steam trap, having an inlet port 2 and an outlet port 3, and including a screen 4 therein. A valve seat 5 is provided with an inlet passage 6 and an outlet passage 7, as well as with a concentric outer valve seat 8 and inner valve seat 9, with an annular groove 10 being provided between these valve seats. An inner cover 11, is screwed to said principal body 1 so that said valve seat 5 is fixed to the body 1 and at the same time forms a pressure chamber 12. Within said pressure chamber 12, a disc valve 13 is arranged, and in an annular space 12a formed between said inner cover 11 and said outer valve seat 8 within said pressure chamber 12, bimetallic means such as a bimetal ring 14 having an open portion is arranged in such a manner that expanding and contracting actions are permitted according to temperature change. Additionally, in said annular space 12a above said bimetal ring 14, an annular member 17 is inserted in a position allowing it to slide vertically, said member having a conical slant face 15 on its lower side and a suitable plane portion 16 extending in a horizontal direction at the lower end of said slant face 15. On an inner wall of said inner cover 11, an overhanging portion 11a is provided so that said annular member might not be raised beyond a predetermined height. Said bimetal ring 14 comprises two metal plates, of which the inner one has a larger coefficient of thermal expansion, and said ring contracts at lower temperature to push upwardly said annular member 17, as shown in FIG. 1, thus opening the disc valve 13, while a higher temperature it expands to lower said annular member 17 below the plane of the valve seat, as shown in FIG. 2. On an outer wall of said outer valve seat 8 and an inner wall of said inner cover 11, there are provided annular grooves 18 and 19, which serve as a means within which together dust or foreign matter entering said annular space 12a thereby avoiding interference by said foreign matter with expansion and contraction of the bimetal ring 14.

An outer cover 20 is screwed to the principal body 1, forming an empty chamber 21 between it and the inner cover 11, which chamber is connected with the side of inlet port 2 of said trap principal body 1 through a connecting passage 22. A holder 23 for screen 4, and a plug 24 are also provided. Between said principal body 1 and said valve seat 5 there are provided packings 25 and 26, between said principal body 1 and said outer cover 20 there is provided a packing 28, and between said principal body 1 and said holder 23, a packing 29 is provided.

Referring now to the operation of the device of the present invention, when the trap is not used, the bimetal ring 14 contracts, and this contracting force is changed into an axial thrust by means of the slant face 15 of annular member 17 to push member 17 upwardly. The bimetal ring 14 locates on the plane portion 16 at the lower end of said member 17 to push up the disc valve 13, which is thus placed in an opened state. At the beginning of steam supply, a large quantity of air and cold condensate are continuously exhausted. At this moment, since said bimetal ring 14 locates between the valve seat 5 and both of the plane portions of the annular member 17, the stability of bimetal ring 14 is very good, even though the disc valve 13 should violently strike against the valve seat due to the change of dynamic pressure of air or the like, and the disc valve 13 will not close during the venting of air. In this manner, air and cold condensate at the beginning of steam supply are exhausted, then high temperature condensate flows in, so that the bimetal ring 14 is heated and expanded to lower the annular member 17, as shown in FIG. 2. Thus, the disc valve 13 is made free and thereafter according to the operating principles of known disc type steam traps the disc valve 13 is opened and closed.

In the above mentioned embodiment, there is used a bimetal ring which will expand at higher temperature and contract at lower temperature. However, this invention is not limited to such a ring. For instance, when a bimetallic member comprising two sheets of metallic material having a higher coefficient of thermal expansion on the outer sheet, is used with an annular member having a slant face formed as an inverted conical shape, as shown in FIG. 3, a similar effect to the above may be obtained.

In said two embodiments of this invention, an annular member having a conical slant face or an inverted conical slant face may be used, respectively, for changing radial expanding and contracting actions into vertical ones, with the bimetal ring being controlled by said member not to move to higher position than the plane of the valve seat. However, in a steam trap in which a slanted face is formed on the side of the valve seat, a similar effect may be formed on side of valve seat, a similar effect may be obtained when a flat annular member is used as shown in FIG. 4 and FIG. 5.

Figure 3:
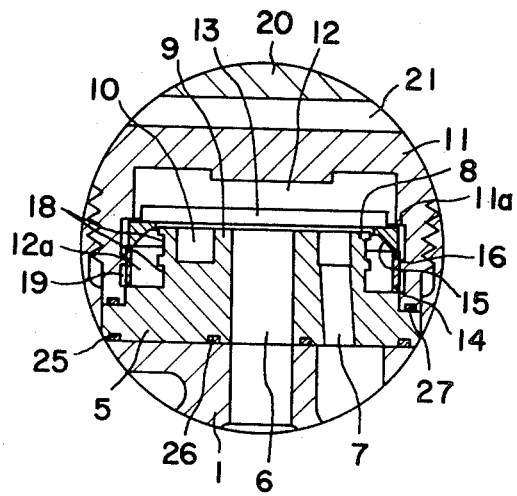
FIG. 3, FIG. 4 and FIG. 5 are enlarged longitudinal sections of main parts, showing other embodiments of this invention.
Figure 4:
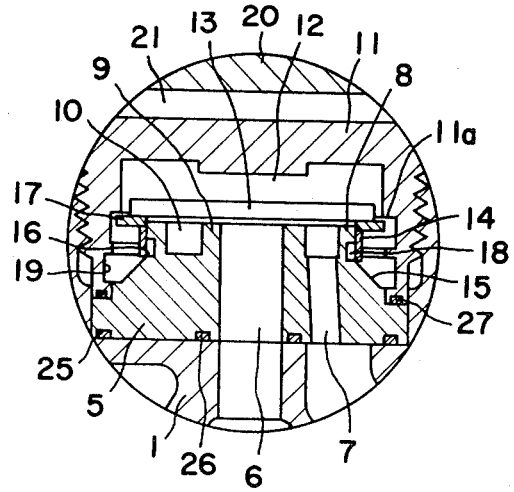
Figure 5:
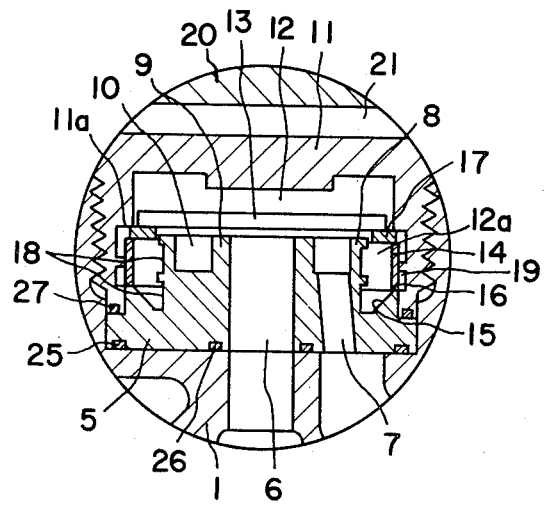

Namely, in FIG. 4, an annular member, which has the same effect as the bimetal rings used in the embodiment shown in FIG. 1 and FIG. 2, is used, and in FIG. 5, an annular member, which has the same effect as the bimetal ring used in the embodiment shown in FIG. 3, may be used.

In this manner, the disc type steam trap according to this invention is so constructed that a bimetal ring is completely received within an annular space formed between a valve seat and an inner cover by means of an annular member and so that the bimetal ring might not move beyond a fixed position, so that even though the trap is attached vertically or inversely. The bimetal ring would never protrude from said annular space and at higher temperature it would never hinder the closing action of the disc valve.

Further, since annular grooves are provided on an outer wall of said valve seat and on an inner wall of said inner cover, said grooves extending to the surface for controlling the contraction and expansion of said bimetal ring, even when dust or foreign matter enters said annular space during the operation of the trap, said dust will be pushed aside by the lower end of said bimetal ring to gather it within said grooves when said bimetal ring expands and contracts, thus the bimetal ring may expand and contract smoothly within the predetermined limits. Also, at the time of starting the air in the piping is smoothly vented and during operation, even though the pressure chamber is filled with air and air binding occurs temperature drop within the pressure chamber will actuate the bimetal ring to push up the disc valve through the annular member and the air within the pressure chamber is exhausted to eliminate any trouble in working.

Figure 6:
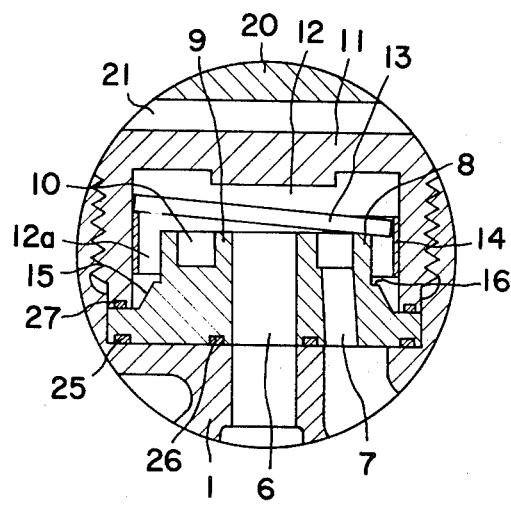
FIG. 6 is an enlarged longitudinal section of main parts of an ordinary disc type steam trap not utilizing the principles of the present invention, showing the disc valve caught by the bimetal ring and rendered inoperative.

An example of the type of problem which may be encountered in an ordinary steam trap not utilizing the present invention is depicted in FIG. 6. As shown therein, no annular member such as the annular member 17 is provided between the bimetal ring 14 and the disc valve 13. Accordingly, as a result of the pressures and vibrations developed during operation, the disc valve 13 has become displaced into a position rendering the steam trap inoperative. This type of problem is avoided with the structure of the present invention.

Thus, it will be seen that there is provided according to this invention, a trouble free disc type steam trap, which operates smoothly and accurately in a continuous manner with high performance, thereby effecting a significant contribution within the relevant art.

What is claimed is:

1. In a disc-type steam trap, the combination comprising means defining a valve seat, a disc valve arranged to engage and disengage said valve seat, bimetallic means operable to expand and contract in a diametral direction relative to said disc valve upon exposure to variations in temperature, means comprising a slanted surface extending obliquely to said diametral direction, said bimetallic means engaging said slanted surface to be moved thereby in a direction perpendicular to said diametral direction upon expansion or contraction of said bimetallic means, said combination including an annular member interposed between said bimetallic means and said disc valve for transmitting said perpendicular motion of said bimetallic means to said disc valve to effect movement of said disc valve in said perpendicular direction thereby to effect engagement and disengagement thereof with said valve seat.

2. A steam trap according to claim 1 comprising means for limiting the extent of movement of said annular member in a direction perpendicular to said diametral direction.

3. A steam trap according to claim 1 comprising means for limiting the extent of movement of said bimetallic means in said diametral direction.

4. A steam trap according to claim 1 wherein said slanted surface means are located upon said annular member.

5. A steam trap according to claim 1 wherein said slanted surface means are located separately from said annular member and engage said bimetallic means in a manner to propel said annular member in a direction perpendicular to said diametral direction upon expansion or contraction of said bimetallic means.

6. A steam trap according to claim 1 comprising means defining an annular chamber within which said bimetallic means is located, said annular chamber means being juxtaposed relative to said bimetallic means to limit expansion and contraction thereof in said diametral direction.

7. A steam trap according to claim 1 comprising grooved means defined within said steam trap and juxtaposed relative to said bimetallic means to enable accummulation within said grooved means of foreign matter to avoid interference by said foreign matter with movement of said bimetallic means.

8. A steam trap according to claim 2 wherein said means limiting perpendicular movement of said annular member comprise means abutting said annular member at a predetermined position in the path of movement thereof.

* * * * *